(12) United States Patent
Huseman (10) Patent No.: US 7,865,287 B2
(45) Date of Patent: Jan. 4, 2011

(54) METHOD AND APPARATUS FOR CONTROLLING POWER FLOW IN A HYBRID POWERTRAIN SYSTEM

(75) Inventor: Steven C. Huseman, Noblesville, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 769 days.

(21) Appl. No.: 11/731,653

(22) Filed: Mar. 29, 2007

(65) Prior Publication Data

US 2008/0243346 A1    Oct. 2, 2008

(51) Int. Cl.
*G06F 19/00* (2006.01)

(52) U.S. Cl. ............... 701/53; 180/65.235; 180/65.265; 180/65.27; 180/165

(58) Field of Classification Search ........... 701/22, 701/53, 54
See application file for complete search history.

(56) References Cited

U.S. PATENT DOCUMENTS

| | | | |
|---|---|---|---|
| 6,205,379 B1 * | 3/2001 | Morisawa et al. ............ 701/22 |
| 7,076,356 B2 * | 7/2006 | Hubbard et al. ............ 701/55 |
| 2002/0147530 A1 * | 10/2002 | Tamagawa et al. ............ 701/22 |
| 2005/0080537 A1 * | 4/2005 | Cawthorne et al. ............ 701/51 |

OTHER PUBLICATIONS

BGH, Beschluss v. 17.10.2001—X ZB 16/00 "Suche fehlerhafter Zeichenketten" in Bl.f. PMZ, 104.Jg./2002, S.114-117.

* cited by examiner

*Primary Examiner*—Khoi Tran
*Assistant Examiner*—Rodney King (57) ABSTRACT

There is described hybrid powertrain operation and control. Preferred power flows from an engine to an electro-mechanical transmission and from an energy storage system to an electric machine are determined based upon an operator torque request. Operation of the engine, the electric machine, and the electro-mechanical transmission are controlled to substantially meet the operator torque request. Actual power flow from the energy storage device is monitored. The power flow from the engine is adjusted based upon a difference between the actual and preferred power flows from the energy storage device.

19 Claims, 5 Drawing Sheets

METHOD AND APPARATUS FOR CONTROLLING POWER FLOW IN A HYBRID POWERTRAIN SYSTEM

TECHNICAL FIELD

This invention pertains generally to control systems for hybrid powertrain control systems, including those employing electromechanical transmissions.

BACKGROUND OF THE INVENTION

The statements in this section merely provide background information related to the present disclosure and may not constitute prior art.

Hybrid vehicles (HEVs) have propulsion systems that consist of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs.

Powertrain architectures for HEVs manage the input and output torques of various prime movers, most commonly internal combustion engines and electric machines. Series hybrid architectures are generally characterized by an internal combustion engine driving an electric generator which in turn provides electrical power to an electric drivetrain and to an energy storage system, comprising a battery pack. The internal combustion engine in a series HEV is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel HEV architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel HEV powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions (i.e., input-split, output-split and compound-split configurations) thereby enabling high-torque continuously variable speed ratios, electrical energy-dominated launches, regenerative braking, engine off idling, and two-mode operation.

As noted, such complex EVT HEVs utilize one or more electric machines and require advanced energy transmission, conversion and storage systems to supply electrical energy to and receive and store electrical energy from these machines, and typically comprise, for example, at least one electric machine, power inverter module, power bus, electrical energy storage device (ESD), such as a battery, as well as various control electronics, control algorithms and other associated items. The ESD may comprise any suitable energy storage system that is adapted for high-density energy storage, including a battery, ultracapacitor, or other high-density energy storage device. As used herein, reference to a battery includes not only a single battery, also includes any combination of single or multiple batteries, or cells thereof, into a battery pack or array, or a plurality of battery packs or arrays. As used herein, the term battery generally refers to any secondary or rechargeable battery.

Current system operation is described with reference to an operator torque request, To_req, in the form of an accelerator pedal tip-in/tip-out maneuver. The operator torque request (To_req) is typically input to the system via the accelerator pedal, to generate an output torque command (To_cmd) in the hybrid control system. The hybrid control system monitors system operation at each operating point as the vehicle accelerates, and determines power flow from the electrical machine and the engine through the EVT for each point, typically using engine speed and torque as two key criteria to determine the power flow from the primary power source and the hybrid transmission system. Determining these points along with the operator torque request solves the dynamic system equations and determines the power flow from the energy storage system. The engine generates a torque input, with additional torque generated by electrical energy which is transferred to the electric machines to generate torque that is transmitted to the EVT.

In operation, the overall control scheme determines the operator torque request, To_req, and determines an optimum torque input, Opt_Ti, from the engine to meet the torque request. The optimum torque input preferably comprises an input torque determined within a solution space of feasible input torques in accordance with a plurality of powertrain system constraints that results in a minimum overall powertrain system loss. A preferred method for determining the optimum torque input is described in detail in commonly assigned U.S. Pat. No. 7,076,356 B2, which is incorporated by reference in its entirety. From the optimum input torque, motor torques output from the electrical motor(s) is determined, and electrical energy transfer to the electrical motor(s) is adjusted to operate the powertrain system to meet the operator torque request.

Output from the engine typically includes torque transferred to the input of the transmission, and accessory loads. The accessory loads are often driven by separate pulleys output from the engine, and include such devices as air-conditioning compressors and pumps. Furthermore, passenger compartments for vehicle systems consume electrical power originating from the electrical storage devices. Power consumed by the accessory loads is normally estimated by the control system and not directly measured; therefore some loads are often unaccounted for in determining the optimum torque input from the engine. In addition conditions may exist at which the engine is unable to produce the desired torque due to extreme high or low ambient and operating temperatures, variations in fuel quality, component wear and deterioration, and system or component faults. Under such operation, the engine may not produce the optimum input torque to the transmission when the engine speed and torque are commanded to the speed/load operating point, i.e., Ne and Te. Torque output from the electrical motor(s) is controlled to meet the operator torque request, consuming additional electrical power.

Therefore, there is a need for a control scheme which control operation of the powertrain system to minimize unexpected, unanticipated, or unaccounted for electrical power during ongoing operation.

SUMMARY OF THE INVENTION

In accordance with an aspect of the invention, there is provided an article of manufacture, comprising a storage medium having a machine-executable program encoded therein. The article of manufacture is adapted to operate a hybrid powertrain. The powertrain comprises an internal combustion engine, an energy storage system, an electric machine, and an electromechanical transmission. The energy storage system and electric machine are electrically-operatively coupled for power flow therebetween. The engine, electric machine, and the electromechanical transmission are mechanically-operatively coupled to transmit power therebetween to generate a power flow to an output. The program code includes determining an operator torque request. Preferred power flows from the engine to the electro-mechanical transmission and from the energy storage system to the electric machine are determined based upon the operator torque request. Operation of the engine, the electric machine, and the electromechanical transmission are controlled to substantially meet the operator torque request. Actual power flow from the energy storage device is monitored. The power flow from the engine is adjusted based upon a difference between the actual and preferred power flows from the energy storage device. These and other aspects of the invention are described hereinafter with reference to the drawings and the description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DESCRIPTION OF A PREFERRED EMBODIMENT OF THE INVENTION

Figure 1:
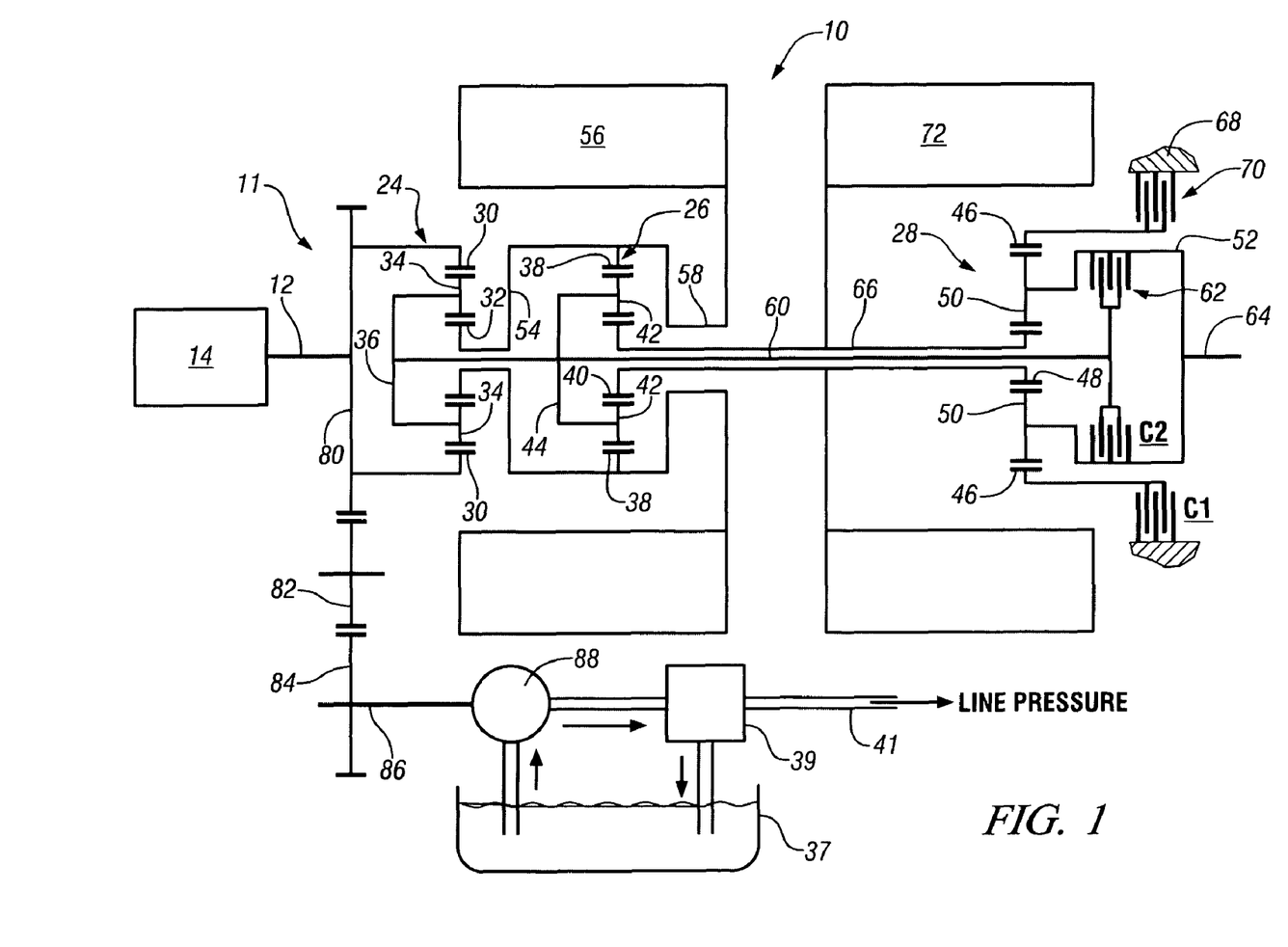
FIGS. 1 and 2 are schematic diagrams of an exemplary architecture for a control system and powertrain, in accordance with the present invention.
Figure 2:
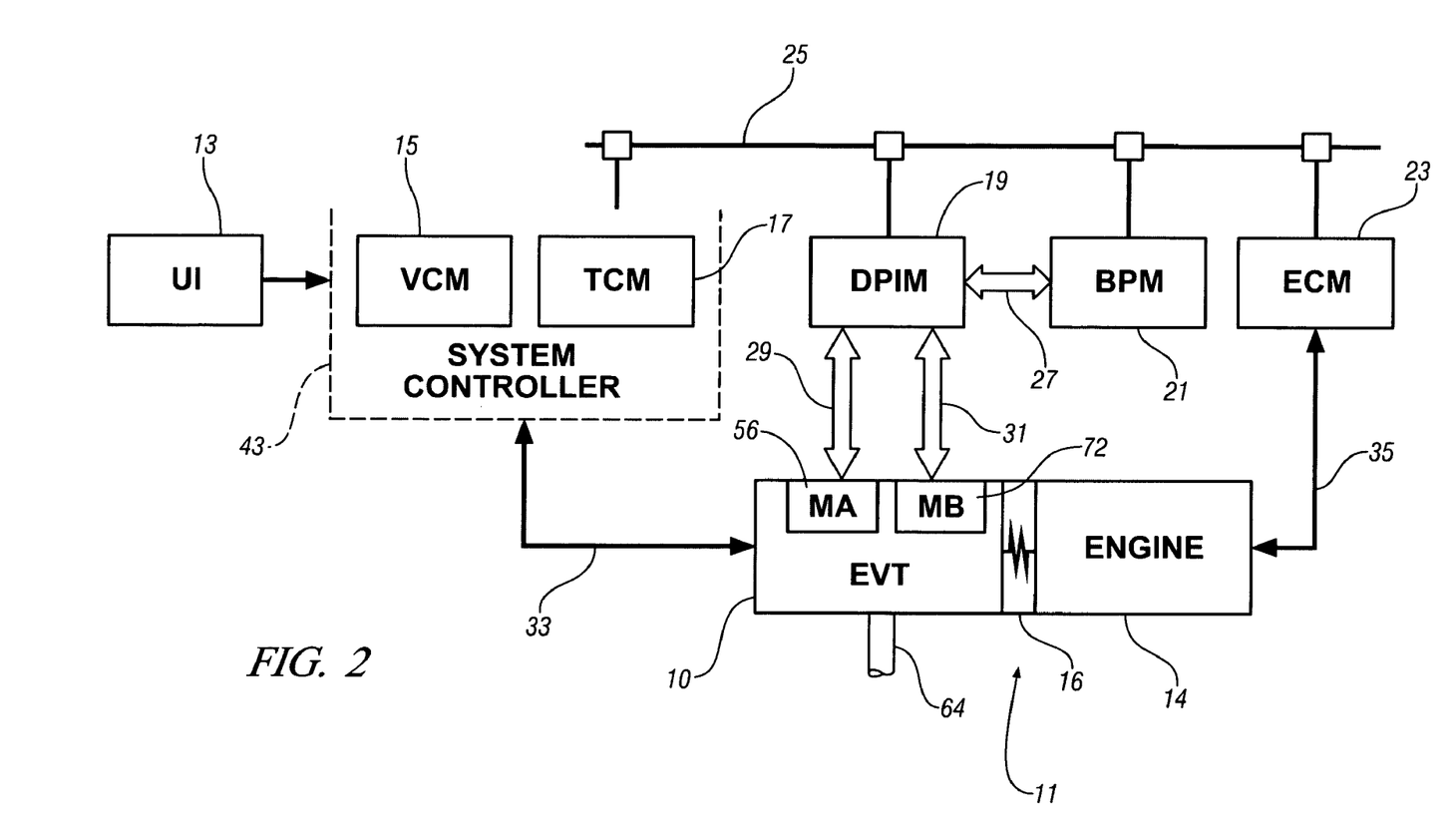

Referring now to the drawings, wherein the depictions are for the purpose of illustrating the invention only and not for the purpose of limiting the same, FIGS. 1 and 2 depict schematic diagrams of a hybrid powertrain that has been constructed in accordance with an embodiment of the invention. The invention includes a control scheme preferably executed as one or more algorithms and predetermined calibrations which are executed to control operation of the hybrid powertrain to meet an operator torque request. The powertrain preferably comprises an internal combustion engine, an energy storage system, one or more electric machines, and an electro-mechanical transmission. The energy storage system and the electric machine are electrically-operatively coupled for power flow therebetween. The engine, the electric machine and the transmission are mechanically-operatively coupled for power flow therebetween to generate a torque output to a driveline. An exemplary powertrain is described in commonly assigned U.S. Pat. No. 5,931,757, entitled Two-MODE COMPOUND SPLIT ELECTRO-MECHANICAL VEHICULAR TRANSMISSION, which is incorporated by reference in its entirety. The hybrid powertrain disclosed therein comprises a compound-split electrically variable transmission for a hybrid electric vehicle which has characteristics of both a series and a parallel device which generally comprise at least one drive motor, such as an internal combustion engine, at least one electric machine that is adapted to both provide propulsion to the vehicle and generate electric power for storage on the vehicle, and electrical energy storage device, also referred to as a battery pack module (BPM) which typically comprises a rechargeable or secondary battery, as described herein. The invention may be used as a control algorithm for controlling operation of a hybrid powertrain, including one as referenced above and described hereinbelow.

Referring again to FIGS. 1 and 2, the hybrid powertrain system 10 is now described in detail, comprising an internal combustion engine and an electric energy storage device which are adapted to transfer energy to electric machines and the electro-mechanical transmission. The engine and the electric machines and the electro-mechanical transmission are selectively operative to transmit torque therebetween to generate an output, typically the driveline, and having characteristics of torque and speed. The electric machines and the electromechanical transmission comprise one representative form of a multi-mode, compound-split, electrically variable transmission (EVT) particularly suited for implementing the controls of the present invention and designated generally by the numeral 10. The EVT 10 has an input member 12 preferably comprising shaft that is directly driven by the engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine, which is readily adapted to provide its available power output through shaft 12. The engine 14 preferably operates, after start-up, and during the majority of its input, at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to by a sleeve shaft 58 to a first motor/generator 56, referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to an output member 64. When the EVT 10 is used in a land vehicle, the output member 64 is typically connected to the vehicular axles (not shown) that may, in turn, terminate in the drive members (also not shown), to provide tractive torque thereto. The drive members are either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72, referred to herein variously as motor B or MB. All the planetary gear subsets 24, 26 and 28 as well as motor A and motor B (56, 72) are coaxially oriented, as about the axially disposed shaft 60. Both motors A and B are of an annular configuration, permitting them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero.

Engine 14 is preferably electronically controlled by engine control module (ECM) 23 as illustrated in FIG. 2. ECM 23 is a conventional microprocessor-based diesel engine control module comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engine electronics, controls and quantities are generally well known to those skilled in the art and further detailed exposition thereof is not required herein The EVT 10 selectively receives power from the engine 14 and battery pack module (BPM) 21. The powertrain system also includes such energy storage devices which are an integral part of the power flows thereof. Other electric storage devices that have the ability to store electric power and dispense electric power may be used in place of the batteries without altering the concepts of the present invention. The BPM 21 is high-voltage, DC-coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based control modules comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines, and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

Each of the aforementioned control modules, i.e., system controller 43, DPIM 19, BPM 21, ECM 23, is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. The various modules communicate via controller area network (CAN) bus 25 to transfer information. The CAN bus 25 effects structured communication of control parameters and commands between the various modules. The specific communication protocol utilized is application-specific. For example the preferred protocol for heavy duty applications is the Society of Automotive Engineers standard J1939.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25, 40, and 100 milliseconds during ongoing engine and vehicle operation. Alternatively, algorithms may be executed in response to occurrence of an event.

In the exemplary embodiment, system controller 43 comprises a pair of microprocessor-based control modules designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. Also illustrated is user interface (UI) block 13 which comprises inputs to system controller 43 such as vehicle accelerator pedal position, push button shift selector (PBSS) for available drive range selection, brake effort and fast idle requests among others, from which an operator torque request (To_req) is determined.

System controller 43 determines an engine torque command Te_cmd which is provided to ECM 23. The engine torque command Te_cmd is representative of the EVT torque contribution desired from the engine. System controller 43 also determines an engine speed command, Ne_cmd, representative of the desired input speed to the EVT, which in the direct coupled arrangement between the engine and the EVT is also the desired engine speed operating point. Although the engine can be directly coupled with the transmission, the engine torque, Te, may not be the same as the input torque, Ti, to the transmission due to power consumed by the accessory loads and other factors that are incompletely accounted for, e.g., extreme high or low ambient and operating temperatures and altitudes, variations in fuel quality, component wear and deterioration, and system or component faults. These loads are depicted as ACC in FIG. 4, referred to hereinbelow. Accessory loading can consume as much as 20 to 60 kW of power (about 27-81 horsepower) when the engine cooling fan and air conditioner are fully on. Desired input speed operating points are preferably determined as disclosed in commonly assigned and co-pending U.S. patent application Ser. No. 10/686,508 and Ser. No. 10/686,034 which are incorporated herein by reference. A preferred speed control for a hybrid transmission is described in detail in commonly assigned and co-pending U.S. patent application Ser. No. 10/686,511 which is incorporated herein by reference.

Figure 3:
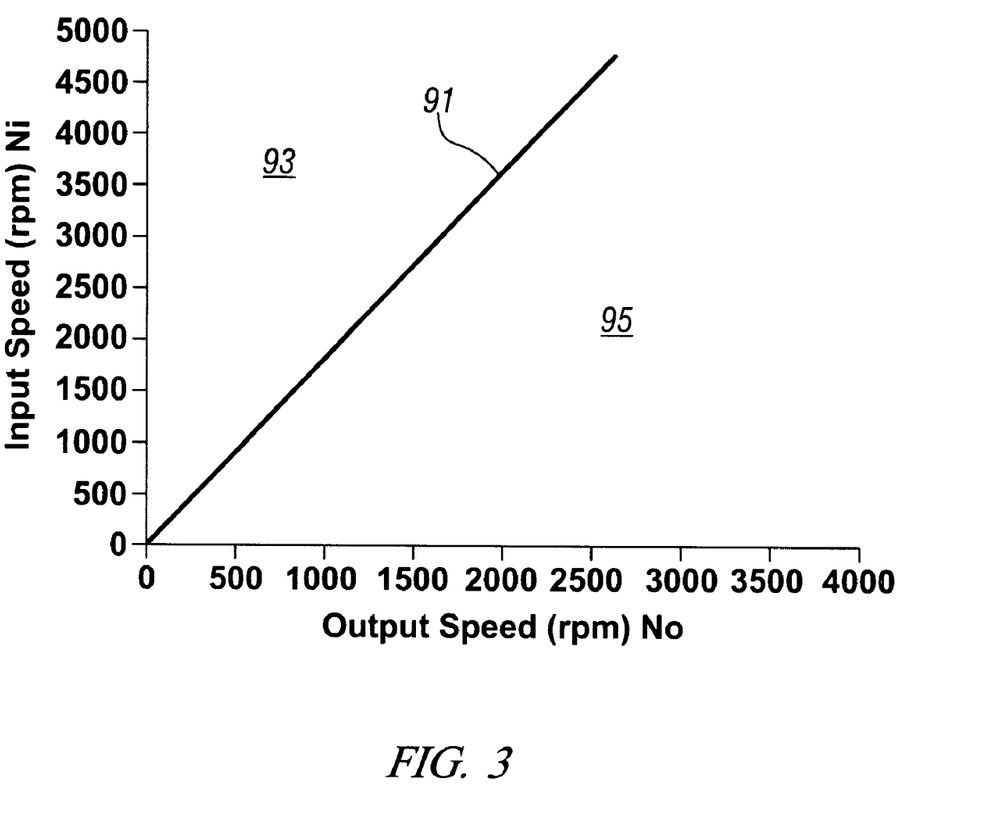
FIG. 3 is a data graph, in accordance with the present invention.

Referring now to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio operation. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g., mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g., mass, size, cost, inertial capabilities, etc.) to the high speeds of region 93. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4:
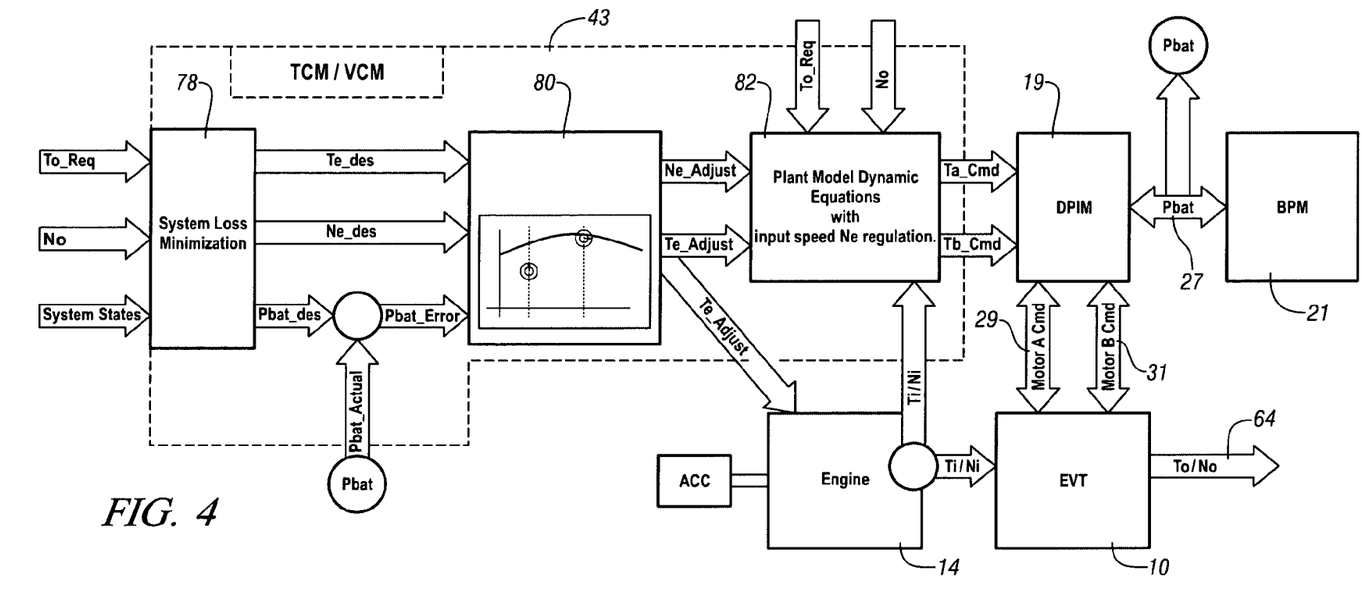
FIGS. 4 and 5 are schematic diagrams of a control scheme.

Referring now to FIG. 4, there is depicted a control scheme for operating the powertrain described with reference to FIGS. 1, 2, and 3, in accordance with the invention. As depicted, operation of aspects of the engine 14 and DPIM 19 are controlled to control power flow to the transmission 10 for output to the driveline. The engine has a plurality of uncontrolled accessory loads and other load contributors, depicted as ACC, which are typically estimated by the control system and not directly measured, as previously described. The control module 43 executes control schemes in the form of algorithms and predetermined calibrations. The algorithm is preferably regularly executed during one of the aforementioned control module loop cycles during ongoing engine and vehicle operation.

Overall, the control scheme comprises determining an operator torque request and other operating parameters, and determining a preferred power flow from the engine to the electromechanical transmission and a preferred power flow from the energy storage system to one or both of the electric machines based thereon. Operation of the engine, the electric machine, and the electromechanical transmission are controlled to substantially meet the operator torque request. Actual power flow from the energy storage device is monitored, and, the preferred power flow from the engine is adjusted to meet accessory loading and minimize uncontrolled power flow from the energy storage device. This is now described in detail.

In the embodiment, inputs to the control module 43 comprise the operator torque request, To_req, output speed No, and various system states, shown as inputs to System Loss Minimization block 78. The system states include current battery power (Pbat) battery state of charge (SOC), battery throughput (typically in Amp-hours/hour), and temperatures of the motors and the batteries. Costs are assessed for the system states. System losses are minimized. Additional detail in determining and assessing costs and minimizing losses for system states for a hybrid powertrain system is disclosed in commonly assigned U.S. Pat. No. 7,149,618 B2, the contents of which are incorporated by reference. Outputs from the System Loss Minimization block 78 comprise preferred power flow from the engine, referred to as desired engine torque and speed commands, Te_des and Ne_des, and a power flow from the BPM to the electrical motors. The desired power flow, referred to as desired battery power flow, Pbat_des, comprises a preferred power flow from the BPM to the electric motors, based upon minimizing system losses. An error between the actual power flow and the desired output power from the BPM is determined, referred to as Pbat_error.

The battery power error, Pbat_error, and the desired engine torque and speed commands, Te_des and Ne_des are input to a closed loop control scheme 80, preferably comprising a proportional-integral type controller described with reference to FIGS. 5 and 6. The closed loop control scheme monitors the inputs, and generates a power correction factor. The power correction factor represents the power required from the primary power source, i.e., the engine, to minimize undesired power flow from the BPM, i.e., battery power error, Pbat_error. The power correction factor is separated into adjusted engine speed and torque terms, referred to as Ne_adjust and Te_adjust. The adjusted torque is input to the ECM to control operation of the engine, as depicted. The adjusted engine speed and torque terms, along with the torque request (To_req) the output speed (No) of the transmission, and the transmission input speed and torque (Ti, Ni) are input to plant model dynamic equations 82 to determine torque commands to MA and MB, referred to as the torque commands Ta_cmd and Tb_cmd. A preferred method for torque management using dynamic equations is described in detail in commonly assigned U.S. Pat. No. 6,976,388 B2, which is incorporated by reference in its entirety.

The torque commands Ta_cmd and Tb_cmd for the electric machines are adjusted during ongoing operation have the output torque, To, match the operator torque request, To_req, except in conditions described herein. In operation, the adjusted engine torque command, Te_adjust is input to the ECM 23 to control engine operation to generate torque which is used to transmit power to the accessories, ACC, as needed, and to provide input power in the form of input torque, Ti, and input speed, Ni, to the transmission.

Figure 5:
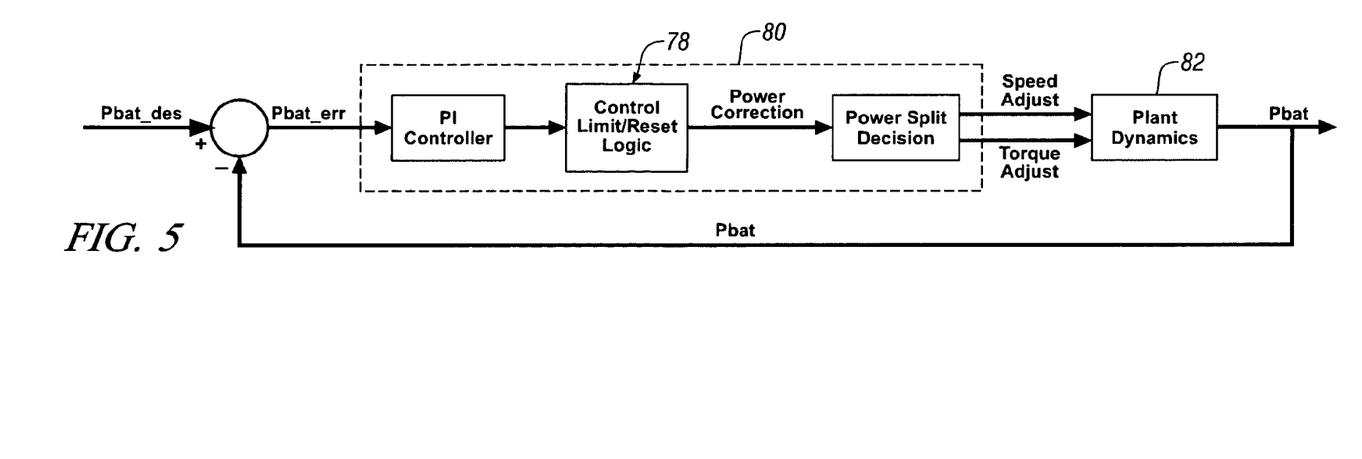

Referring now to FIG. 5, the closed loop control scheme 80 is now described. The error term (Pbat_error), comprising the difference between the battery power flow and the desired battery power flow, is determined and input to a proportional-integral (PI) controller. The PI controller preferably comprises a conventional PI controller having a relatively slow update rate and limited control authority, as is described with reference to FIG. 6, described below. The slow update rate avoids interaction with fast control loops such as shifting logic and fast vehicle transients. The limited control authority prevents the system from overcorrecting for gross errors such as engine component failure. The output of the PI controller is input to a control limit and reset logic scheme, described with reference to FIG. 6. An output power correction is determined, and this is input to a power split decision-making element, which determines the adjusted engine speed and torque terms, referred to as Ne_adjust and Te_adjust. The adjusted engine speed and torque terms are input to the plant, i.e., the engine and transmission, preferably through the plant model 82. The adjusted engine torque term, Te_adjust, is input to the ECM to control operation of the engine.

Figure 6:
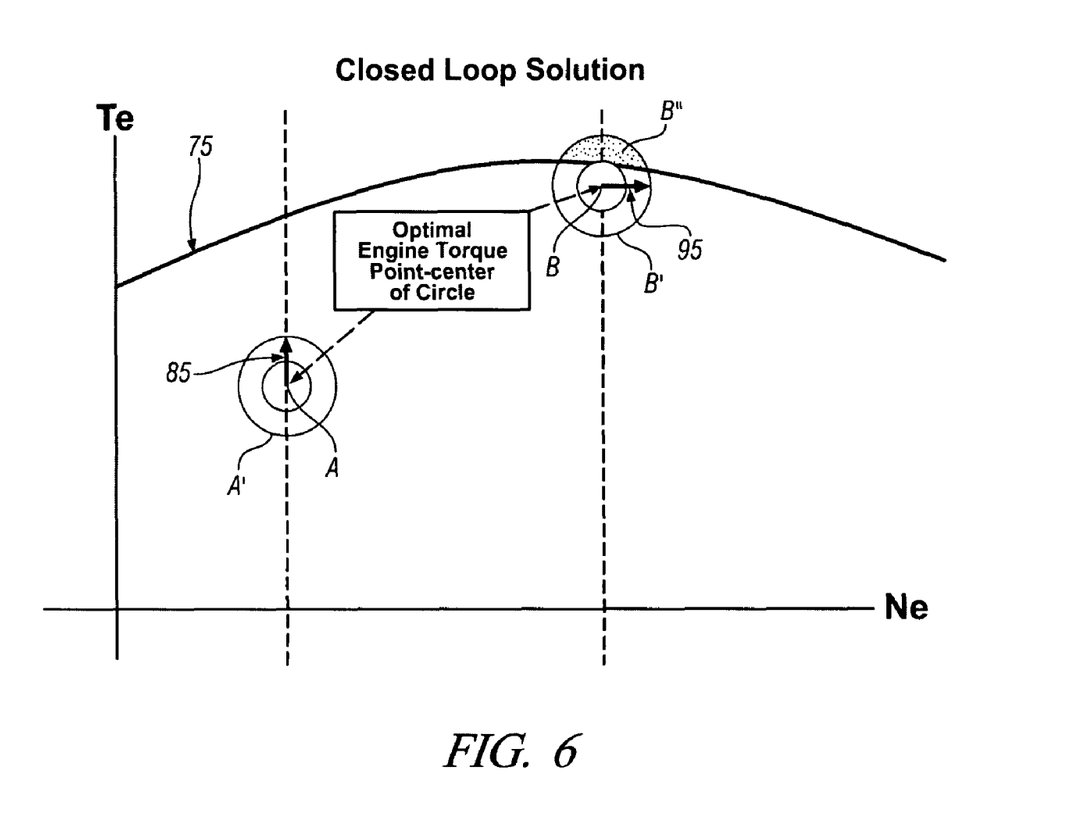
FIG. 6 is a data graph, in accordance with the present invention.

Referring now to FIG. 6, aspects of the closed loop solution are now described. There is depicted an engine speed/load operating range, including an engine operating curve 75, which comprises a typical engine lug curve. For a given engine speed, Ne, the lug curve represents an upper limit for engine torque, Te. When engine speed and torque are below the operating curve 75, the control limit and reset logic portion of the closed loop control scheme acts to preferentially adjust engine output torque, Te, in response to the error term (Pbat_error). This is depicted with reference to Point A, comprising a low speed, low load operating point such as occurs during a light cruise. The point A represents an optimal engine input torque to the transmission for the speed/load operating point, with the circle A' representing limits to the control authority for adjusting speed and torque using the PI controller. An adjustment vector 85 preferentially adjusts the engine torque at low load, low speed operating conditions. Therefore, in this operating condition, the power split comprises adjusting the engine torque command, to control operation to reduce the error term (Pbat_error) to zero. The speed command, Ne_adjust, is unchanged. The torque command Te_adjust is output to the ECM to adjust operation and control the engine 14 accordingly. The Ti_adjust command and the unchanged Ne_adjust command are output to the plant model 82, which determines the torque commands to the electrical machines through the DPIM 19, to reduce and eliminate the uncontrolled electrical power discharge, including that caused by the accessory load.

When the engine speed and torque are near the operating curve 75, the control limit and reset logic portion of the closed loop control scheme acts to preferentially adjust engine output speed, Ne, in response to the error term (Pbat_error). This is depicted with reference to Point B, comprising a high speed, high load operating point such as occurs during a high-load operation or an uphill grade operation. The point B represents an optimal engine input torque to the transmission for the speed/load operating point, with the circle B' representing limits to the control authority for adjusting speed and torque using the PI controller, further limited as described hereinafter. An adjustment vector 95 preferentially adjusts the engine speed at the high load, high speed operating condition. Therefore, in this operating condition, the power split comprises maintaining the engine torque command substantially unchanged, and adjusting the engine input speed, Ne_adjust, to control operation to reduce the error term (Pbat_error) to zero. The Te_adjust command, which is substantially unchanged from the Te command, is output to the ECM to control the engine 14. The Ne_adjust command and the unchanged Te_adjust command are output to the plant model 82, which determines the torque commands to the electrical machines through the DPIM 19 to reduce and eliminate the uncontrolled electrical power discharge, including that caused by the accessory load.

When the engine operating point is at or beyond the operating curve 75, depicted as B'', the engine exceeds its capability to adjust either speed or torque, and there is a need to derate the engine, and reduce the torque output, To, in order to reduce and eliminate the uncontrolled electrical power discharge, including that caused by the accessory load.

The foregoing discussion discloses and describes exemplary embodiments of the present invention. One skilled in the art will readily recognize from such discussion, and from the accompanying drawings and claims that various changes, modifications and variations therein without departing from the spirit and scope of the invention as defined by the following claims.

The invention claimed is:

1. Article of manufacture, comprising a storage medium having a machine-executable program encoded therein to operate a hybrid powertrain, the powertrain comprising an internal combustion engine, an energy storage system, an electric machine, and an electro-mechanical transmission, the energy storage system and electric machine electrically-operatively coupled for power flow therebetween; and, the engine, electric machine, and the electro-mechanical transmission mechanically-operatively coupled to transmit power therebetween to generate a power flow to an output member, the program comprising:
   code to determine an operator torque request;
   code to determine a preferred engine power and a corresponding preferred power flow from the energy storage system to the electric machine in response to the operator torque request;
   code to operate the engine to achieve the preferred engine power;
   code to operate the electric machine to meet the operator torque request when the engine is operated to achieve the preferred engine power;
   code to monitor actual power flow from the energy storage device to the electric machine during the operation; and,
   code to operate the engine to adjust engine power in response to a difference between the actual and preferred power flows from the energy storage device to the electric machine.

2. The article of claim 1, wherein the code to determine the preferred engine power and the corresponding preferred power flow from the energy storage system to the electric machine in response to the operator torque request further comprises: code to determine an optimum input power from the engine to the transmission, and, code to determine the power flow from the energy storage system to the electric machine to meet the operator torque request corresponding to the optimum input power from the engine to the transmission.

3. The article of claim 2, wherein the code to determine the input power from the engine to the transmission comprises code to determine an engine torque command and an engine speed command which minimize power loss of the powertrain system.

4. The article of claim 1, wherein the code to monitor the actual power flow from the energy storage device comprises code to monitor electric current flowing to the electric machine.

5. The article of claim 1, wherein the code to operate the engine to adjust engine power in response to a difference between the actual and preferred power flows from the energy storage device to the electric machine comprises code to execute a closed loop control scheme to selectively adjust one of an engine torque command and an engine speed command in response to the difference between the actual and preferred power flows from the energy storage device to the electric machine.

6. The article of claim 5, further comprising code to execute the closed loop control scheme to selectively adjust the engine torque command when the engine torque output is substantially less than a maximum engine torque output.

7. The article of claim 5, further comprising code to execute the closed loop control scheme to adjust the engine speed and the engine torque commands when the engine torque output approaches a maximum engine torque output.

8. The article of claim 5, further comprising code to execute the closed loop control scheme to selectively adjust the engine speed command when the engine torque output is substantially at a maximum engine torque output.

9. The article of claim 5, further comprising code to reduce the power flow to the output member when the engine torque command exceeds a maximum engine torque output.

10. The article of claim 1, further comprising: code to selectively reduce the power flow from the energy storage device to the electric machine when the difference between the actual and preferred power flows from the energy storage device exceeds a predetermined threshold.

11. Article of manufacture, comprising a storage medium having machine-executable program encoded therein to operate a hybrid powertrain, the powertrain comprising an internal combustion engine, an energy storage system, an electric machine, and an electro-mechanical transmission, the energy storage system and electric machine electrically-operatively coupled for electric power flow therebetween, the engine, electric machine, and the electro-mechanical transmission mechanically-operatively coupled to transmit mechanical power therebetween to generate a power flow to an output member in response to an operator torque request, the program comprising:

- code to determine an operator torque request;
- code to determine a preferred input power to the transmission and a corresponding preferred power flow from the energy storage system to the electric machine to meet the operator torque request;
- code to operate the engine to generate engine power to achieve the preferred input power;
- code to control the electric machine to meet the operator torque request when the engine is operated to generate the engine power to achieve the preferred input power;
- code to monitor actual power flow from the energy storage device to the electric machine;
- code to determine an amount the preferred input power exceeds an actual input power to the transmission corresponding to a difference between the preferred power flow from the energy storage system to the electric machine and the actual power flow from the energy storage device to the electric machine; and,
- code to adjust the generated engine power corresponding to the amount the preferred input power exceeds the actual input power to the transmission.

12. The article of claim 11, wherein the generated engine power exceeds the preferred input power to the transmission by an amount based upon at least one of power consumed by accessory loads, ambient temperature, operating temperature, altitude, fuel quality, component faults, and, component deterioration.

13. The article of claim 11, wherein the code to determine the preferred input power to the transmission and the corresponding preferred power flow from the energy storage system to the electric machine to meet the operator torque request further comprises: code to determine an optimum generated engine power, and, code to determine the power flow from the energy storage system to the electric machine corresponding to the optimum generated engine power to meet the operator torque request.

14. The article of claim 13, wherein the code to determine the optimum generated engine power comprises code to determine an engine torque command and an engine speed command that minimize power loss of the powertrain system.

15. The article of claim 11, wherein the code to adjust the generated engine power corresponding to the amount the preferred input power exceeds the actual input power to the transmission comprises code to execute a closed loop control scheme to adjust an engine torque command and an engine speed command responsive to the difference between the actual and preferred power flows from the energy storage device to the electric machine.

16. The article of claim 15, further comprising code to execute the closed loop control scheme to selectively adjust only the engine torque command when the engine torque output is substantially less than a maximum engine torque output.

17. The article of claim 15, further comprising code to execute the closed loop control scheme to selectively adjust only the engine speed command when the engine torque output is substantially at a maximum engine torque output.

18. The article of claim 17, further comprising code to reduce the power flow to the output member when the engine torque command output exceeds the maximum engine torque output.

19. Article of manufacture, comprising a storage medium having machine-executable program encoded therein adapted to operate a hybrid powertrain, the powertrain comprising an internal combustion engine, an electric energy storage system, two electric machines, and an electro-mechanical transmission, the energy storage system and the electric machines electrically-operatively coupled for electric power flow therebetween; and, the engine, electric machines, and the electro-mechanical transmission mechanically-operatively coupled to transmit mechanical power therebetween and transmit mechanical power to an output member, the program comprising:

- code to determine an operator torque request;
- code to determine a preferred mechanical power flow from the engine to the electro-mechanical transmission and preferred electric power flow from the energy storage system to the electric machines responsive to the operator torque request;
- code to control the engine to generate the preferred mechanical power flow and control electric power flow from the electric energy storage device to the two electric machines to meet the operator torque request;
- code to monitor actual electric power flow from the electric energy storage device to the electric machines; and,
- code to adjust the mechanical power flow from the engine to reduce a difference between the actual electric power flow and the preferred electric power flow from the electric energy storage system to the two electric machines.

* * * * *